Sept. 27, 1938.                R. G. N. EVANS                2,131,170
                                  BEARING
                             Filed July 8, 1935
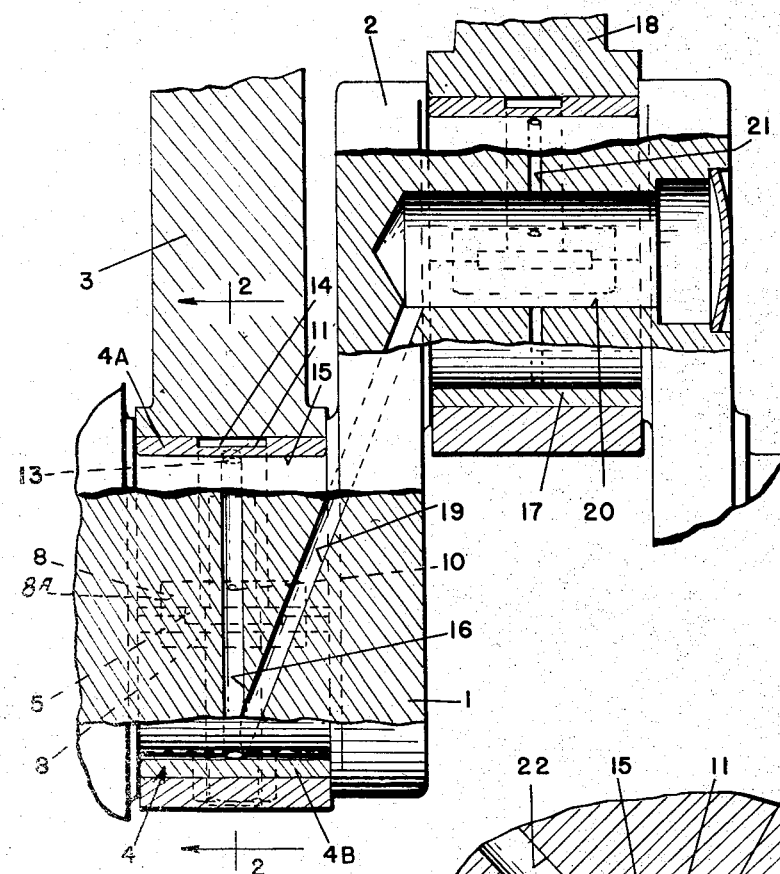
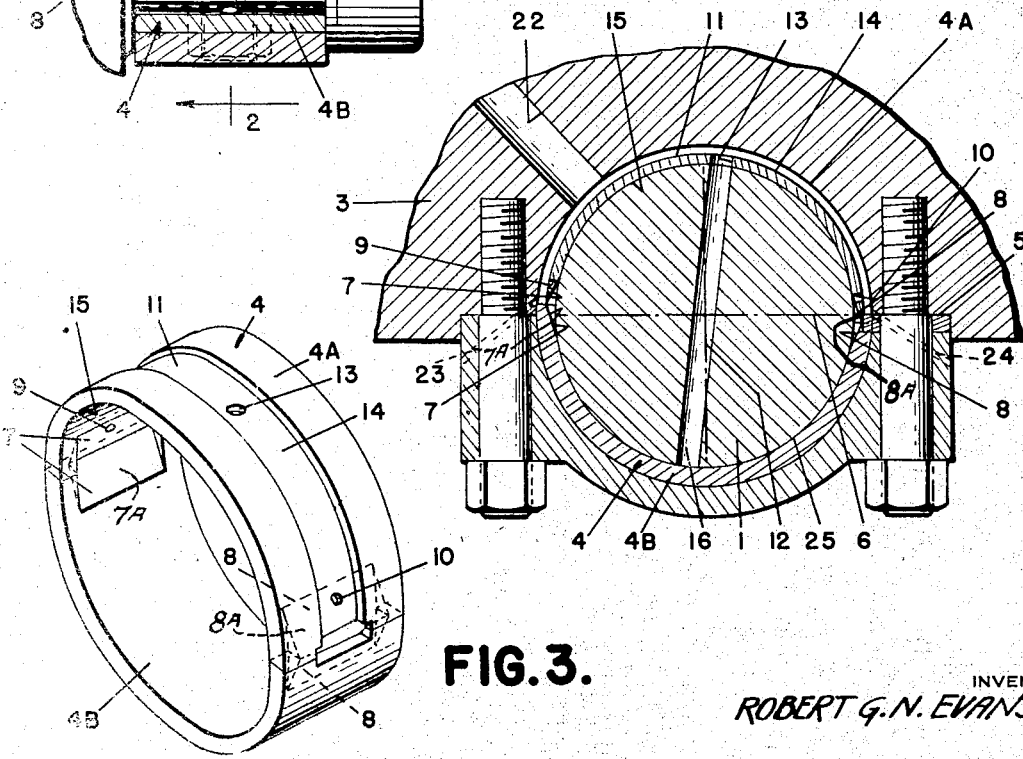
INVENTOR
ROBERT G. N. EVANS
ATTORNEYS Patented Sept. 27, 1938

2,131,170

UNITED STATES PATENT OFFICE 2,131,170

BEARING

Robert G. N. Evans, Toledo, Ohio, assignor to The Bunting Brass & Bronze Company, Toledo, Ohio, a corporation of Ohio Application July 8, 1935, Serial No. 30,368

8 Claims. (Cl. 308—122)

This invention relates generally to bearings and refers more particularly to sleeve bearings.

One of the essential objects of the invention is to provide a bearing of this type wherein provision is made for delivering from the back of the bearing to the inner rubbing surface or contact area thereof enough lubricant such as oil to maintain a film on said rubbing surface.

Another object is to provide a bearing wherein provision is made for delivering oil successively from various points of the back of the bearing to an oil receiving hole or passage in a rotary element within said sleeve bearing.

Another object is to provide a bearing wherein provision is made for receiving oil from a suitable source such as a manifold without breaking up the film and delivery aforesaid.

Another object is to provide an improved bearing that can be manufactured at a comparatively low cost.

Other objects, advantages and novel details of construction of this invention will be made more apparent as this description proceeds, especially when considered in connection with the accompanying drawing, wherein:

Figure 1 is a fragmentary vertical sectional view through a portion of an internal combustion engine and showing a bearing embodying my invention applied to the crank shaft thereof;

Figure 2 is a sectional view taken substantially on the line 2—2 of Figure 1;

Figure 3 is a perspective view of the sleeve bearing.

Referring now to the drawing, 1 is a rotary shaft having a crank portion 2, 3 is a case or stationary support for said shaft, and 4 is a bearing embodying my invention sleeved upon said shaft within said support. As shown, the bearing 4 has two semicircular sections or half bearings 4ª and 4ᵇ which fit snugly within the support 3 and are held against rotary and creeping movements therein by a suitable locking member or key 5. Preferably the ends of these half bearings meet or abut at diametrically opposite points slightly offset above and below a horizontal center line 6. Both half bearings 4ª and 4ᵇ are provided upon opposite sides of this center line 6 with chamfered portions 7 and 8 respectively providing oil sumps 7ª and 8ª. The upper half bearing 4ª has two radially extending holes 9 and 10, respectively, approximately one-sixteenth of an inch (1/16") in diameter extending therethrough approximately eight degrees (8°) above the center line 6 in communication with the sumps 7ª and 8ª, and is provided upon the back thereof from one end to the other with a circumferentially extending channel or groove 11 which cooperates with the support 3 to form a passage for oil. Approximately seven degrees (7°) to one side of a vertical line 12 at right angles to the line 6 is another hole 13 that is approximately one-eighth of an inch (1/8") in diameter and extends radially of the half bearing 4ª from the base 14 of the channel 11 to the inner working face 15 of the bearing.

Located in the shaft 1 is an oil passage 16 which is adapted to successively register with the holes 9, 13 and 10 during rotation of the shaft 1 in the bearing 4, and extending from this passage 16 through the crank portion 2 toward another bearing 17 for a connecting rod 18 is another passage 19 for oil. As shown, the passage 19 discharges into the hollow portion 20 of the crank arm 2 and communicates with a passage 21 leading to the bearing 17. Any suitable means such as a sub-manifold 22 leading from a main manifold (not shown) for oil may be used to conduct oil to the circumferentially extending channel 11 in the back of the main bearing 4. Likewise, if desired, two waste ducts or drain passages 23 and 24, respectively, each one-sixteenth of an inch (1/16") in diameter may be drilled in the case 3 for communication with the channel 11 below the holes 9 and 10 to receive foreign matter in the oil.

In use, oil from the manifold 22 will enter the channel 11 and will be supplied through the holes 9 and 10 to the sumps 7ª and 8ª from which it will spread in a film over the rubbing surface or contact area 15 of the bearing. Additional oil will run through hole 13 to said rubbing surface 15. Likewise, oil will be supplied to passage 16 in the crank shaft as said passage registers successively with the holes 9, 13 and 10 in the main bearing 4. Foreign matter in the oil will drain out passages 23 and 24.

Thus, from the foregoing it will be apparent that the oil delivery from the back of the bearing 4 to the rubbing surface or contact area 15 thereof may be effected without breaking up the oil film on said surface or area, and that the oil supply is sufficient to cause delivery thereof through passage 16 to the connecting rod 18 while some oil and foreign matter are being discharged through the passages 23 and 24. As illustrated in Figure 2, the high pressure area is at 25, hence it will be apparent that the supply of oil in my construction is on the approach or opposite side of said area 25 so that a better and more efficient supply of oil to the working parts is assured.

What I claim as my invention is:

1. A bearing having an inner bearing surface for a shaft provided with a passage therein, said bearing having a lubricant supply groove in the outer surface thereof extending partially circumferentially of the bearing and periodically communicating with said passage in the shaft through an opening in the bearing surface, and lubricant receiving sumps in said bearing surfaces at opposite ends of the groove and communicating with the latter.

2. A bearing having an inner bearing surface for a shaft provided with a transversely extending passage therethrough, said bearing having circumferentially spaced lubricant sumps in the bearing surface communicating with a lubricant supply groove in the outer surface of the bearing and having an opening between the sumps in communication with the supply groove and periodically communicating with the transverse passage through the shaft.

3. A bearing having an inner bearing surface provided with diametrically opposed lubricant sumps in the bearing surface communicating with a lubricant supply groove extending partially circumferentially of the bearing in the outer surface of the latter, the area of the inner bearing surface between the sumps being uninterrupted with the exception of an opening communicating with the lubricant supply groove, and means periodically communicating with the opening to supply lubricant to the portions of the bearing surface between the sumps and opposite the grooved side of the bearing.

4. A bearing having an inner bearing surface for a shaft provided with a passage therethrough, said bearing having circumferentially spaced lubricant sumps in the inner bearing surface and having a lubricant supply groove in the outer surface of the bearing at the top of the latter communicating with said sumps, and a passage through the grooved portion of the bearing periodically communicating with the opposite ends of the passage through said shaft.

5. A bearing having an inner bearing surface provided with circumferentially spaced sumps, passages through said bearing for connecting said sumps with a lubricant supply, an aperture through said bearing intermediate said sumps for communicating with said lubricant supply, said bearing surface being otherwise uninterrupted, and means for periodically communicating with said aperture to supply lubricant to the uninterrupted portion of said bearing surface opposite said aperture.

6. A bearing having an inner bearing surface for a shaft provided with a passage therethrough, said bearing having circumferentially spaced lubricant sumps in the inner bearing surface and having lubricant supply means communicating with said sumps, and a passage through the bearing in communication with said lubricant supply means and periodically communicating with the opposite ends of the passage through said shaft.

7. A bearing having an inner bearing surface for a shaft provided with a passage therethrough, the outer surface of said bearing being provided with circumferentially extending lubricant supply means, circumferentially spaced lubricant sumps for the inner bearing surface in constant communication with said supply means, and a passage in the bearing communicating with said lubricant supply means and periodically communicating with opposite ends of the passage through said shaft.

8. A bearing having an inner bearing surface for a shaft provided with a passage therethrough, circumferentially spaced lubricant sumps for the inner bearing surface, a passage in the bearing periodically communicating with opposite ends of the passage through said shaft, and a common lubricant supply means for said sumps and the passage in the bearing extending circumferentially of said bearing.

ROBERT G. N. EVANS.